United States Patent
Fujii et al.

[11] Patent Number: 5,906,785
[45] Date of Patent: *May 25, 1999

[54] HEAT-TREATING METHOD OF A THERMOPLASTIC RESIN FILM

[75] Inventors: Atsushi Fujii; Akira Funaki; Ryuji Moriwaki, all of Himeji, Japan

[73] Assignee: Idemitsu Petrochemical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/771,895

[22] Filed: Dec. 23, 1996

[30] Foreign Application Priority Data

Dec. 28, 1995 [JP] Japan ................................. 7-342731

[51] Int. Cl.$^6$ .................................................. B29C 71/02
[52] U.S. Cl. ............................................................ 264/345
[58] Field of Search ................................. 264/232, 234, 264/235.6, 235.8, 345, 346

[56] References Cited

U.S. PATENT DOCUMENTS

| | | |
|---|---|---|
| 2,451,597 | 10/1948 | Wheeler . |
| 2,585,915 | 2/1952 | Chavannes . |
| 2,997,743 | 8/1961 | Isaksen et al. . |
| 3,661,678 | 5/1972 | Keishi et al. ............................. 156/322 |
| 3,679,791 | 7/1972 | Reade ................................. 264/342 RE |
| 3,872,197 | 3/1975 | Kato et al. ............................... 264/40.7 |
| 3,882,207 | 5/1975 | Hannan et al. ............................... 264/1 |
| 3,988,098 | 10/1976 | Kato et al. ................................. 425/224 |
| 4,329,315 | 5/1982 | Brower et al. ............................ 264/555 |
| 4,634,840 | 1/1987 | Yamagishi et al. ...................... 219/388 |
| 5,069,855 | 12/1991 | Takasu et al. ............................ 264/235 |
| 5,411,695 | 5/1995 | Yamada et al. ..................... 254/211.13 |

FOREIGN PATENT DOCUMENTS

| | | |
|---|---|---|
| 0 616 880 | 9/1994 | European Pat. Off. . |
| 59-178223 | 10/1984 | Japan . |

*Primary Examiner*—Ponnathapura Achutamurthy
*Attorney, Agent, or Firm*—Flynn, Thiel, Boutell & Tanis, P.C.

[57] ABSTRACT

A thermoplastic resin film is preheated as the temperature T is changed to at a temperature of Tg<T<m.p.−10° C., and absolutely contacted with a belt by being pressed at a linear pressure of 9.8 N/cm–980.0 N/cm (Tg: glass transition temperature of the thermoplastic resin film, m.p.: melting point of the thermoplastic resin film). Next, the thermoplastic resin film is heated as the temperature T is changed to a temperature of m.p.−20° C.<T<m.p.+20° C. while being absolutely contacted with the belt, and successively, the thermoplastic resin film is cooled while being absolutely contacted with the belt, and then the thermoplastic resin film is peeled from the belt.

8 Claims, 1 Drawing Sheet

HEAT-TREATING METHOD OF A THERMOPLASTIC RESIN FILM

BACKGROUND OF THE INVENTION

1. Field of the Invention

This invention relates to a heat-treating method of a thermoplastic resin film, in which a produced film can be used for structural materials, materials for electronic components and so on.

2. Description of the Related Art

After a thermoplastic resin film is conducted with, for example, simultaneous biaxial orientation, the oriented film is removed with residual stress caused by deformation of the orientation by being heat-treated.

In a conventionally typical heat-treating method, the film is moved while both ends of the film in a direction transverse to the longitudinal direction are fixed in a heating-atmosphere. According to the aforementioned heat-treating method, however, a stress easily concentrates in parts, especially, the stress concentrates in a part where a fish eye, a gel or the like is produced on the film, so that the film is ripped sometimes. Provided that the film is heat-treated at an approximate melting point, the film has a thermal deformation, resulting in a disadvantage that the heat-treatment at an approximate melting point cannot be carried out.

Japanese Patent Application Laid-open No. Sho59-178223 proposes a method, in which an oriented thermoplastic film, having an adherent layer on the surface thereof, undergoes annealing while being attached through the adherent layer on a support plate made by stainless steel.

According to the aforementioned heat-treating method, the film is attached on the support plate by way of the adherent layer, so that the film is prevented from rip caused by the concentrated stress, however, another disadvantage is produced.

That is to say, in order to attach the film on the support plate, the film should be formed with the adherent layer, resulting in necessity of a forming process for the adherent layer. The film should be forcibly peeled from the support plate after the heat-treatment, resulting in difficulty in carrying out processes successively. And further, some types of the films are fused to the support plate made of stainless steel, resulting in impossibility of the successive processes.

SUMMARY OF THE INVENTION

A heat-treating method of a thermoplastic resin film according to the present invention is characterized by the steps of: preheating the thermoplastic resin film as the temperature T is changed to at a temperature of Tg<T<m.p.-10° C. and absolutely contacting the thermoplastic resin film with a belt by pressing the thermoplastic resin film at a linear pressure of 9.8 N/cm–980.0 N/cm (Tg: a glass transition temperature of the thermoplastic resin film, m.p.: a melting point of the thermoplastic resin film); heating the thermoplastic resin film as the temperature T is changed to at a temperature of m.p.-20° C.<T<m.p.+20° C. while the thermoplastic resin film is absolutely contacted with the belt; cooling the thermoplastic resin film while the thermoplastic resin film is absolutely contacted with the belt; and peeling the thermoplastic resin film from the belt.

When the temperature T for heating the thermoplastic resin film is lower than Tg, the absolute contact of the film with the belt is inferior, with the result that the heat-treating temperature of the film becomes uneven. When the temperature T is higher than m.p.-10° C., the film absolutely contacted with the belt is easily deformed, with the result that the accuracy of the thickness of the film is inferior, and furthermore, the film is easily cut or ripped by heating. The preferred temperature is Tg+10° C.<T<m.p.-20° C.

When the thermoplastic resin film is pressed at a linear pressure of less than 9.8 N/cm, it is possible to introduce air between the belt and the film. Further, when a linear pressure is more than 980.0 N/cm, it is possible that the film might be deformed or cut. The preferred linear pressure is defined as 98.0 N/cm–490.0 N/cm.

If the temperature T for heating the thermoplastic resin film is lower than m.p.-20° C., effects of the heat-treatment according to the present invention cannot be sufficiently obtained. If the temperature T is higher than m.p.+20° C., the resin becomes filowable in the heat-treatment, resulting in the inferior accuracy of the thickness of the film.

In the present invention, the belt may be coated with a polyimide resin.

The thickness of the polyimide resin coated on the belt is selective, and more preferably 1 μm–1,000 μm. When the thickness is thinner than 1 μm, the durability of the coated polyimide resin is inferior. When the thickness is thicker than 1,000 μm, the expensive polyimide resin becomes very costly. The peeling properties of the thermoplastic resin film from the belt is improved by the polyimide resin.

In the present invention, it is advisable that the processing steps for absolutely contacting the thermoplastic resin film with the belt by preheating, heating the thermoplastic resin film, and peeling the thermoplastic resin film from the belt are carried out at a different place from one another but are successively carried out by way of the belt.

That is to say, places where the aforementioned three processes are carried out are defined as three places, the belt on which the thermoplastic resin film is absolutely contacted is circulated among the three places, thereby the successive heat-treatment according to the present invention is allowed.

As the specific heat-treatment of the present invention, the aforementioned processing steps are carried out by using an apparatus having a first roller for preheating, a second roller for heating and a third roller for cooling, a metallic endless belt coated with a polyimide resin being wound around the first, second and third rollers, and a fourth roller located to urge the thermoplastic resin film to the first roller through the endless belt, so that the thermoplastic resin film may be guided into between the endless belt and the fourth roller to be preheated as the temperature T becomes a temperature of Tg<T<m.p.-10° C. and absolutely contacted with the belt by being pressed by the fourth roller at a linear pressure of 9.8 N/cm–980.0 N/cm (Tg: glass transition temperature of the thermoplastic resin film, m.p.: melting point of the thermoplastic resin film), the thermoplastic resin film is moved to the second roller to be heated by the second roller as the temperature T is changed to at a temperature of m.p.-20° C.<T<m.p.+20° C. while being absolutely contacted with the belt, and the thermoplastic resin film is moved to the third roller to be cooled by the third roller while being absolutely contacted with the belt and is peeled from the belt.

The material of the aforementioned metallic endless belt can be, for example, stainless steel, titanium alloy or the like.

The thickness of the endless belt is optional, but 0.3 mm–1.5 mm is preferable, more preferably 0.5 mm–0.8 mm. In the belt is thinner than 0.3 mm, the durability of the belt becomes inferior by decreasing the strength of the belt. If the belt is thicker than 1.5 mm, the efficiency of heating and cooling becomes inferior, with the result that the cost for producing is increased. Furthermore, the size of the apparatus is larger by increasing the diameters of the rollers wound with the belt.

The conditions of the thickness of the polyimide resin coated on the metallic endless belt has been described above.

It is advisable that the material of at least the surface of the fourth roller is a heat-resistant resin, for example, a silicone rubber, in order to prevent the introduction of air between the endless belt and the thermoplastic resin film.

As a thermoplastic resin of the aforementioned film, for example, the following can be used: polyethylene, polypropylene, polyvinyl chloride, polvinyl alcohol, polyethylene terephthalate, polyarylate, polyethylene-2,6-naphthalate, polyethylene-α,β bis (2-clorophenoxy-4,4'-dicarboxylate), polyphenylene oxide, polyester, polyphenylene sulfide, polyether etherketone, aromatic polyamides, polyarylate, polyimide, polyamideimide, polyetherimide, syndiotactic polystyrene, biphenyl etherketone and so on.

Incidentally, the apparatus may have at least three rollers of the first roller to the third roller, but can have, for example, a fourth roller as necessary.

In the present invention, a thermoplastic resin film is used, but a sheet can be conceptually included because a sheet differs in only relative thickness from a film.

DETAILED DESCRIPTION OF THE PREFERRED EMBODIMENT(S)

Figure 1:
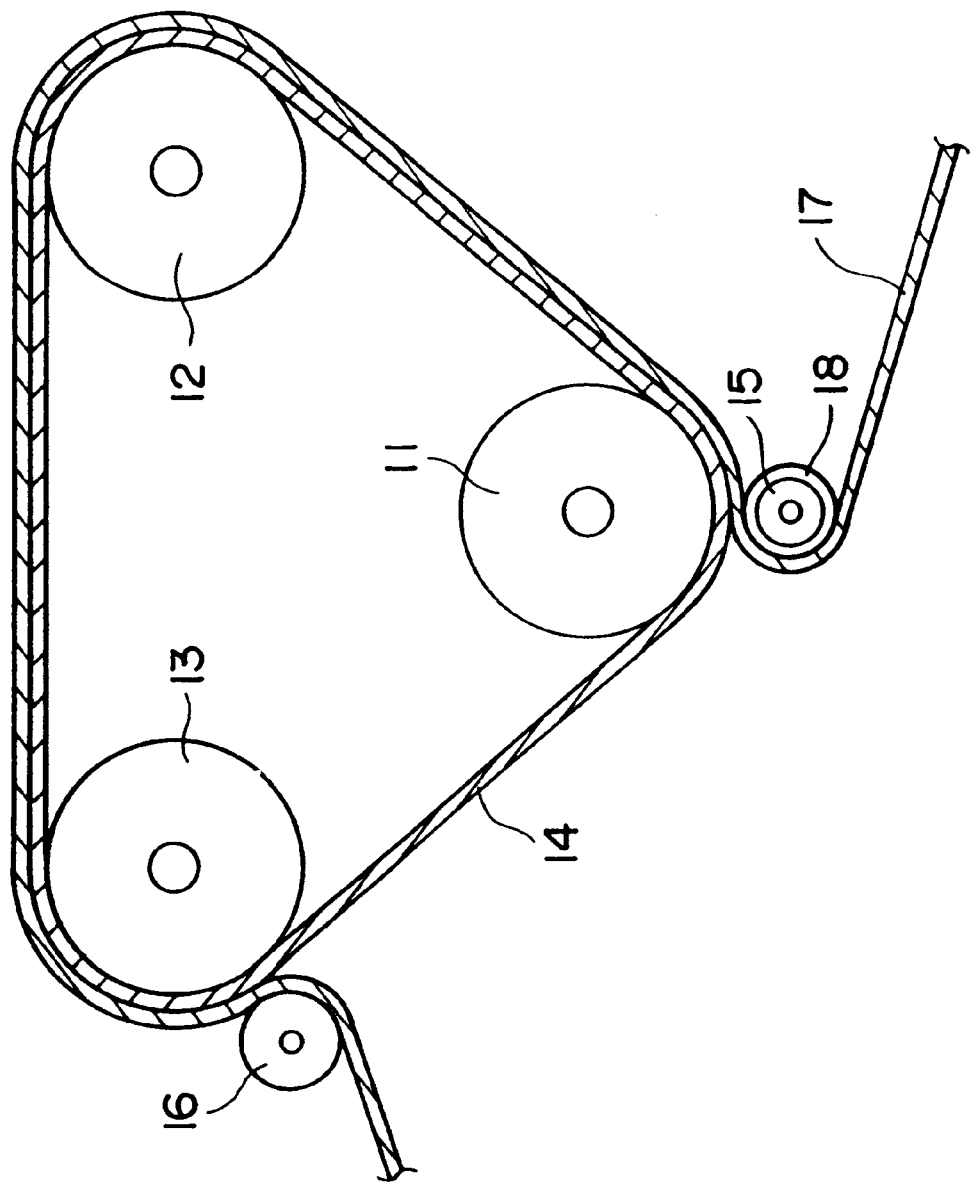
FIG. 1 is a diagrammatic view of a heat-treating apparatus used in a heat-treating method of a thermoplastic resin film according to a preferred embodiment of the present invention.

A heat-treating method of a thermoplastic resin film according to the preferred embodiment of the present invention will be explained below with reference to FIG. 1.

First, a structure of a heat-treating apparatus used in the embodiment will be described.

The heat-treating apparatus is composed of first, second and third rollers 11, 12 and 13, a metallic endless belt 14 wound around the three rollers 11 to 13, a fourth roller 15 abutting through the endless belt 14 to the first roller 11, and a fifth roller 16 abutting through the endless belt 14 to the third roller 13.

In turn, the first roller 11 is for preheating the thermoplastic resin film 17, and has a heating means (not-shown) for controlling the temperature of the first roller 11 at the range of 100° C.–400° C.

The second roller 12 is for heating the thermoplastic resin film 17 and has a heating means (not shown) for controlling the temperature of the second roller 12 at the range of 100° C.–400° C.

The third roller 13 is for cooling the thermoplastic resin film 17 and has a cooling means (not shown) for controlling the temperature of the third roller 13 at the range of 30° C.–200° C.

At least one of the aforementioned first to third rollers 11 to 13 is connected to a driving means for rotating the roller.

The fourth roller 15 is covered with a silicone rubber 18 along the outer circumerefential face thereof. The fourth roller 15 is located to urge the thermoplastic resin film 17 to the first roller 11 through the endless belt 14. The pressing force is a linear pressure of 9.8 N/cm–980.0 N/cm.

The endless belt 14 is made of stainless steel. The thickness of the endless belt 14 is 0.3 mm–1.5 mm.

A polyimide resin is coated in strata on the surface of the metallic endless belt 14, on which the layer of the polyimide resin is 1 μm–100 μm.

The polyimide resin can be coated by any means. For example, after the polyimide acid solution is coated on the endless belt 14, the solvent is removed with heating and drying and the inversion of imide is carried out. In the coating process, in order to avoid forming voids caused by vaporizing water, emitted by a ring closure reaction, and the like, it is advisable to dry in stages, in which the inversion of imide is carried out by heating at 250° C.–400° C. for 20 minutes–60 minutes after the solvent is removed with heating at 80° C.–180° C. for 20 minutes–60 minutes to be dried.

Next, the heat-treating method of the thermoplastic resin film 17 used in the heat-treating apparatus will be described below.

As shown in FIG. 1, with the guiding of the thermoplastic resin film 17 between the endless belt 14 and the fourth roller 15, the thermoplastic resin film 17 is preheated by the first roller 11 as the temperature T becomes a temperature of Tg<T<m.p.–10° C., and absolutely contacted with the endless belt 14 by being pressed by the fourth roller 15 at a linear pressure of 9.8 N/cm–980.0 N/cm. Here, Tg is the glass transition temperature of the thermoplastic resin film 17 and m.p. is the melting point of the thermoplastic resin film 17.

Further, the thermoplastic resin film 17 is moved to the second roller 12 by the movement of the endless belt 14 while being absolutely contacted with the endless belt 14, and the thermoplastic resin film 17 is heated by the second roller 12 as the temperature T is changed to at a temperature of m.p.–20° C.<T<m.p.+20° C.

Successively, the thermoplastic resin film 17 is moved to the third roller 13 by the movement of the endless belt 14 while being absolutely contacted with the endless belt 14, and the thermoplastic resin film 17 is cooled by the third roller 13.

After that, the thermoplastic resin film 17 absolutely contacted with the endless belt 14 is peeled from the endless belt 14, and the heat-treated thermoplastic resin film 17 is obtained.

EXPERIMENT 1

In the aforementioned embodiment, the thermoplastic resin film 17 is heat-treated under the following conditions.

The thermoplastic resin film . . . syndiotactic polystyrene (SPS) film of a homotype. Thickness: 100 μm, Tg: 100° C., m.p. : 270° C.

Diameter of the first roller . . . 600 mm

Diameter of the second roller . . . 600 mm

Diameter of the third roller . . . 600 mm

Diameter of the fourth roller . . . 150 mm

Temperature of the first roller . . . 180° C.

Temperature of the second roller . . . 270° C.

Temperature of the third roller . . . 100° C.

Thickness of the endless belt . . . 0.5 mm

Width of the endless belt . . . 500 mm

Thickness of the polyimide resin on the endless belt . . . 30 μm

Linear pressure by the fourth roller . . . 200 N/cm

Moving speed of the endless belt . . . 2 m/min.

EXPERIMENT 2

In Experiment 1, the thermoplastic resin film 17 is heat-treated such that some of the conditions are changed as follows and the rest of the conditions are the same.

The thermoplastic resin film . . . polyether etherketone (PEEK) film. Thickness: 100 μm, Tg: 143° C., m.p.: 334° C.

Temperature of the first roller . . . 200° C.

Temperature of the second roller . . . 330° C.

EXPERIMENT 3

In Experiment 1, the thermoplastic resin film 17 is heat-treated such that some of the conditions are changed as follows and the rest of the conditions are the same.

The thermoplastic resin film . . . polyarylate (PAR) film. Thickness: 100 μm, Tg: 143° C., m.p.: 280° C.

Temperature of the first roller . . . 180° C.

Temperature of the second roller . . . 280° C.

EXPERIMENT 4

In Experiment 1, the thermoplastic resin film 17 is heat-treated such that some of the conditions are changed as follows and the rest of the conditions are the same.

The thermoplastic resin film . . . polyarylate (PAR) film. Thickness: 100 μm, Tg: 143° C., m.p.: 280° C.

Temperature of the first roller . . . 180° C.

Temperature of the second roller . . . 270° C.

COMPARISON 1

In Experiment 1, the thermoplastic resin film is heat-treated under the same conditions except for the belt, which is not coated with a polyimide resin (PI), as the metallic endless belt.

COMPARISON 2

The thermoplastic resin film is heat-treated by using a conventional heat-treating method, which is carried out by moving the film in a heating-atmosphere (280° C.) while both ends of the film in a direction transverse of the longitudinal direction are fixed.

COMPARISON 3

In Experiment 1, the thermoplastic resin film is heat-treated under the same conditions except the temperature of the first roller is 90° C.

COMPARISON 4

In Experiment 1, the thermoplastic resin film is heat-treated under the same conditions except of the temperature of the first roller is 270° C.

COMPARISON 5

In Experiment 1, the thermoplastic resin film is heat-treated under the same conditions except the temperature of the second roller is 240° C.

COMPARISON 6

In Experiment 1, the thermoplastic resin film is heat-treated under the same conditions except the temperature of the second roller is 300° C.

COMPARISON 7

In Experiment 1, the thermoplastic resin film is heat-treated under the same conditions except the temperature of the second roller, and the linear pressure is 5.0 N/cm when the thermoplastic resin film is pressed by the fourth roller is 270° C.

COMPARISON 8

In Experiment 1, the thermoplastic resin film is heat-treated under the same conditions except the temperature of the second roller, and the linear pressure is 1000.0 N/cm when the thermoplastic resin film is pressed by the fourth roller is 270° C.

COMPARISON 9

In Experiment 3, the thermoplastic resin film is heat-treated under the same conditions except the temperature of the second roller is 240° C.

As to the films heat-treated and obtained in the aforementioned experiments and comparisons, the following items of ① to ⑥ are evaluated. The results are shown in Tables 1 and 2. The following is the description of each item of the evaluation and the criterion of evaluation. As to the films obtained in Experiment 3 and Comparison 9, the surface peeling properties is evaluated. The results are shown in Table 3.

① the film is cut or not in the heat-treatment. ○ . . . not cut. X . . . cut.

② the film has a thermal deformation in the heat-treatment. ○ . . . non-appearance of the thermal deformation. X . . . impracticality of the heat-treatment because of the thermal deformation.

③ the film is absolutely contacted with the endless belt or not after the heat-treatment. ○ . . . non absolute contact. X . . . the film is hardly peeled from the endless belt by being absolutely contacted.

④ the film is ripped or not after the heat-treatment. ○ . . . non-rip. X . . . rip.

⑤ the accuracy of the thickness of the film after the heat-treatment. ○ . . . within ±8%. X . . . more than ±8%.

⑥ the change of the physical properties of the film after the heat-treatment. ○ . . . the physical properties are changed and the effects of the heat-treatment are produced. X . . . the physical properties are not changed and the effects of the heat-treatment are not produced or the physical properties are changed but the effects of the heat-treatment are unevenly produced.

The aforementioned surface peeling properties is evaluated by determining whether the surface peeling is produced or not by way of lightly rubbing the surface of the film with sandpaper.

TABLE 1

|  | *A | *B | *C | *D | ① | ② | ③ | ④ | ⑤ | ⑥ |
|---|---|---|---|---|---|---|---|---|---|---|
| Experiment 1 | the invention | SPS | 180° C. | 270° C. | ○ | ○ | ○ | ○ | ○ | ○ |
| Experiment 2 | the invention | PEEK | 200° C. | 330° C. | ○ | ○ | ○ | ○ | ○ | ○ |
| Experiment 3 | the invention | PAR | 180° C. | 280° C. | ○ | ○ | ○ | ○ | ○ | ○ |
| Experiment 4 | the invention | SPS | 180° C. | 270° C. | ○ | ○ | ○ | ○ | ○ | ○ |

*A: the heat-treating apparatus
*B: the materials of the film
*C: the temperature of the first roller
*D: the temperature of the second roller

TABLE 2

|  | *A | *B | *C | *D | ① | ② | ③ | ④ | ⑤ | ⑥ |
|---|---|---|---|---|---|---|---|---|---|---|
| Comparison 1 | non-PI | SPS | 180° C. | 270° C. | X | O | X | X | O | O |
| Comparison 2 | a conventional method | SPS | 180° C. | 270° C. | — | X | — | — | — | — |
| Comparison 3 | the invention | SPS | 90° C. | 270° C. | O | O | O | O | O | X |
| Comparison 4 | the invention | SPS | 270° C. | 270° C. | X | O | O | X | X | O |
| Comparison 5 | the invention | SPS | 180° C. | 240° C. | O | O | O | O | O | X |
| Comparison 6 | the invention | SPS | 180° C. | 300° C. | O | O | O | O | X | O |
| Comparison 7 | the invention | SPS | 180° C. | 270° C. | O | O | O | O | X | O |
| Comparison 8 | the invention | SPS | 180° C. | 270° C. | O | O | O | X | X | O |

*A: the heat-treating apparatus
*B: the materials of the film
*C: the temperature of the first roller
*D: the temperature of the second roller

TABLE 3

|  | the surface peeling |
|---|---|
| Experiment 3 | No |
| Comparison 9 | Yes |

From Table 1, according to the heat-treating method of the thermoplastic resin of each experiment, with the use of the metallic endless belt 14 coated with the polyimide resin, the thermoplastic resin film 17 is preheated by the first roller 11 as the temperature T becomes a temperature of Tg<T<m.p.−10° C., the thermoplastic resin film 17 is absolutely contacted with the endless belt 14 by being pressed by the fourth roller 15 at a linear pressure of 9.8 N/cm–980.0 N/cm, and then the thermoplastic resin film 17 is heated by the second roller 12 as the temperature T is changed to at a temperature of m.p.−20° C.<T<m.p.+20° C. Therefore, any disadvantage as to items ① to ⑥ of the evaluation is not produced, namely, it is understood that the result of the items of the evaluation is fine.

From Table 2, according to Comparison 1, by using the belt which is not coated with the polyimide resin, it is understood that disadvantages are produced in items ①, ③ and ④ of the evaluation.

According to Comparison 2, the film has a thermal deformation during heat-treatment by the conventional heat-treating method, with the result that a heat-treated film cannot be obtained.

According to Comparison 3, since the temperature T heated in the first roller is lower than Tg (100° C.), a disadvantage is produced in item ⑥.

According to Comparison 4, since the temperature T heated in the first roller is higher than m.p. −10° C. (260° C.), disadvantages are produced in items ①, ④ and ⑤.

According to Comparison 5, since the temperature T heated in the second roller is lower than m.p. −20° C. (250° C.), a disadvantage is produced in item ⑥.

According to Comparison 6, since the temperature T heated in the second roller is higher than m.p. +20° C. (290° C.), a disadvantage is produced in item ⑤.

According to Comparison 7, since the linear pressure is less than 9.8 N/cm when the thermoplastic resin film is pressed by the fourth roller, a disadvantage is produced in item ⑤.

According to Comparison 8, since the linear pressure is more than 980.0 N/cm when the thermoplastic resin film is pressed by the fourth roller, disadvantages are produced in items ④ and ⑤.

From Table 3, according to Experiment 3, the resin of the thermoplastic resin film is, especially, a mesomorphic polymer, so that it is understood that effect of preventing the film from peeling by the heat-treatment according to the present invention.

But, according to Comparison 9, although the resin of the thermoplastic resin film is a mesomorphic polymer, the temperature T heated by the second roller is lower than m.p.−20° C. (260° C.), with the result that surface peeling is produced in the test for surface peeling.

What is claimed is:

1. A method of heat-treating a thermoplastic resin film, comprising the steps of:
   preheating the thermoplastic resin film to a temperature T of Tg<T<m.p. −10° C. and absolutely contacting the thermoplastic resin film with a belt by pressing the thermoplastic resin film at a linear pressure of 9.8 N/cm–980.0 N/cm, wherein Tg is the glass transition temperature of the thermoplastic resin film and m.p. is the melting point of the thermoplastic resin film;
   heating the thermoplastic resin film to a temperature T of m.p. −20° C.<T<m.p. +20° C. while the thermoplastic resin film is absolutely contacted with the belt;
   cooling the thermoplastic resin film while the thermoplastic resin film is absolutely contacted with the belt; and
   peeling the thermoplastic resin film from the belt.

2. The method according to claim 1, wherein the thermoplastic resin film is contacted with the belt by being pressed at a linear pressure of 98.0 N/cm–490.0 N/cm.

3. The method according to claim 1, wherein the thermoplastic resin film is preheated to a temperature of Tg+10° C.<T<m.p.−20° C.

4. The method according to claim 1, wherein the belt is coated with a polyimide resin.

5. The method according to claim 4, wherein the thickness of the polyimide resin coated on the belt is 1 μm–1,000 μm.

6. The method according to claim 1, wherein said processing steps for absolutely contacting the thermoplastic resin film with the belt by preheating, heating the thermoplastic resin film, and peeling the thermoplastic resin film from the belt are carried out at a different place from one another but are successively carried out with the belt.

7. The method according to claim 1, wherein said processing steps are carried out by using an apparatus having a first roller for preheating, a second roller for heating, a third roller for cooling, a metallic endless belt coated with a polyimide resin wound around the first, second and third rollers, and a fourth roller located to urge the thermoplastic resin film to the first roller through the endless belt, so that the thermoplastic resin film is guided between the endless belt and the fourth roller to be preheated to a temperature T of Tg<T<m.p. −10° C. and absolutely contacted with the belt by being pressed by the fourth roller at a linear pressure of 9.8 N/cm–980.0 N/cm, wherein Tg is the glass transition temperature of the thermoplastic resin film and m.p. is the melting point of the thermoplastic resin film, the thermoplastic resin film is moved to the second roller and heated by the second roller to a temperature T of m.p. −20° C.<T<m.p. +20° C. while being absolutely contacted with the belt, the thermoplastic resin film is moved to the third roller to be cooled by the third roller while being absolutely contacted with the belt and is peeled from the belt.

8. The method according to claim 7, wherein the thickness of the endless belt is 0.3 mm–1.5 mm.

* * * * *